(12) United States Patent
Xiao et al.

(10) Patent No.: US 11,662,306 B2
(45) Date of Patent: May 30, 2023

(54) SUPERCRITICAL CARBON DIOXIDE STATE MONITORING AND CONTROL SYSTEM BASED ON INFRARED SPECTRUM CHARACTERISTIC ANALYSIS

(71) Applicant: Zhejiang University, Hangzhou (CN)

(72) Inventors: Gang Xiao, Hangzhou (CN); Yafei Liu, Hangzhou (CN); Mingjiang Ni, Hangzhou (CN); Kefa Cen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 209 days.

(21) Appl. No.: 17/368,044

(22) Filed: Jul. 6, 2021

(65) Prior Publication Data

US 2022/0307973 A1   Sep. 29, 2022

(30) Foreign Application Priority Data

Mar. 26, 2021  (CN) .......................... 202110328116.8

(51) Int. Cl.
G01N 21/3504     (2014.01)
(52) U.S. Cl.
CPC . G01N 21/3504 (2013.01); *G01N 2021/3536* (2013.01)

(58) Field of Classification Search
CPC ....... G01N 21/3504; G01N 2021/3536; G05D 27/02
See application file for complete search history.

(56) References Cited

U.S. PATENT DOCUMENTS 6,927,393 B2 *  8/2005  Cotte ................... G01N 21/359
250/336.1

* cited by examiner

*Primary Examiner* — David P Porta
*Assistant Examiner* — Meenakshi S Sahu
(74) *Attorney, Agent, or Firm* — David D. Brush; Westman, Champlin & Koehler, P.A.

(57) ABSTRACT

A supercritical carbon dioxide state monitoring and control system based on infrared spectrum characteristic analysis. The system includes: a test section for carbon dioxide to pass through; an infrared light source emitting a detection beam to the carbon dioxide passing through the test section; an infrared spectrometer receiving and analyzing the detection beam passing through the carbon dioxide; and a pressure control module controlling pressure of the carbon dioxide at a set value. In addition, the system also includes a temperature control module capable of monitoring and adjusting temperature of the supercritical carbon dioxide. The supercritical carbon dioxide state monitoring and control system may monitor and control a state of the carbon dioxide at an inlet of an apparatus under an actual operation condition in a Brayton cycle system, which improves working performance of the apparatus in the Brayton cycle system, thereby improving overall efficiency of the Brayton cycle system.

9 Claims, 3 Drawing Sheets

SUPERCRITICAL CARBON DIOXIDE STATE MONITORING AND CONTROL SYSTEM BASED ON INFRARED SPECTRUM CHARACTERISTIC ANALYSIS

TECHNICAL FIELD

The present disclosure relates to the field of gas monitoring and control, and particularly relates to a supercritical carbon dioxide state monitoring and control system based on infrared spectrum characteristic analysis.

BACKGROUND

In recent years, the development of renewable energy and efficient and clean utilization of energy have become the main task in the energy field due to the increasing ultra-high voltage power transmission capacity, large-scale grid connection of renewable energy power generation and the increasingly strict environmental protection requirements by the government. Improving the power cycle efficiency of generator sets and reducing power generation costs have become important means for the renewable energy to better satisfy the new trend of power generation.

The efficient conversion and utilization of energy is generally realized through thermodynamic cycle systems. A Brayton cycle system, as a typical thermodynamic cycle system, has obvious advantages in thermal efficiency. In a simple Brayton cycle system, a working medium goes through four processes, that is, isentropic compression, isobaric heat absorption, isentropic expansion, and isobaric cooling, to achieve efficient conversion and utilization of the energy. Compared with a traditional steam Rankine cycle, the supercritical carbon dioxide Brayton cycle system exhibits higher cycle efficiency at working temperature higher than 550° C., and when the working medium is in a supercritical state, a change of the compression volume around a critical point is small, accordingly, the compressor power is reduced, and the cycle efficiency is greatly improved. Carbon dioxide around the critical point has many excellent properties, for example, viscosity close to that of gas, strong fluidity, easy to diffuse and low cycle loss. Therefore, only strictly controlling the state of the supercritical carbon dioxide at the inlet of the compressor can further improve the efficiency of the supercritical carbon dioxide Brayton cycle system.

At present, the state of the supercritical carbon dioxide at the inlet of the compressor is mainly determined indirectly by measuring temperature and pressure at the inlet end of the compressor. Due to the complicated state change of the carbon dioxide around the critical point and current limitation by the temperature test accuracy, a tiny temperature difference can cause significant changes in the corresponding specific heat, density, viscosity and other physical properties of the carbon dioxide, making it impossible to accurately monitor the actual state of the carbon dioxide at the inlet of the compressor; in addition, the arrangement of temperature sensors will disturb the flow field distribution of the carbon dioxide in the pipeline, making the actual state of the carbon dioxide at the inlet of the compressor greatly deviate from a monitoring result; and furthermore, inaccurate physical property data of the carbon dioxide around the critical point has a significant impact on the design and optimization of the thermodynamic system in a cooling and compression process, and then affects the flow and heat transfer characteristics of the carbon dioxide working medium in a precooler, a compressor and other apparatuses, which has an important impact on the stable operation and cycle efficiency of the system.

Therefore, how to accurately monitor and control the physical property state of the cycle working medium carbon dioxide in the supercritical carbon dioxide cycle system under an actual operation working condition is a great challenge in the prior art.

SUMMARY

An exemplary aspect of the present disclosure relates to a supercritical carbon dioxide state monitoring and control system based on infrared spectrum characteristic analysis, which may monitor and control a state of a working medium at an inlet of an apparatus under an actual operation condition in a supercritical carbon dioxide Brayton cycle system, which improves working performance of a compressor and other apparatuses in the Brayton cycle system, thereby improving overall efficiency of the Brayton cycle system. The supercritical carbon dioxide state monitoring and control system based on the infrared spectrum characteristic analysis includes: a test section for carbon dioxide to pass through; an infrared light source emitting a detection beam to the carbon dioxide passing through the test section; an infrared spectrometer receiving and analyzing the detection beam passing through the test section; and a pressure control module controlling pressure of the carbon dioxide at a set value. In addition, the system also includes a temperature control module capable of monitoring and adjusting temperature of the supercritical carbon dioxide, wherein the temperature control module may adjust the temperature of the supercritical carbon dioxide, such that transmittance, obtained by means of analysis by the infrared spectrometer, of the supercritical carbon dioxide within a specific wavelengths range is close or equal to that of the supercritical carbon dioxide in a critical state.

According to this technical solution, due to different physical property data of gas at different pressures, the pressure of the supercritical carbon dioxide is controlled at the set value by means of the pressure control module, so as to make the pressure of the carbon dioxide at the inlet of the apparatus under the actual operation condition in the Brayton cycle system stabilized at the set value, that is, around critical pressure of the gas, and then to monitor and control the pressure of the carbon dioxide at the inlet of the apparatus under the actual operation condition. The transmittance, obtained on the basis of actual analysis by the infrared spectrometer, of the supercritical gas is compared with that of the gas in the critical state, first, the pressure of the gas is stabilized at the set value, that is, around the critical pressure by means of the pressure control module; and then, the temperature of the supercritical carbon dioxide is adjusted by means of the temperature control module, such that the transmittance, obtained by means of the analysis by the infrared spectrometer, of the supercritical carbon dioxide is close or equal to that of the gas in a critical state, so as to accurately monitor and control the pressure and the temperature of the supercritical carbon dioxide. It is to be noted that the inventors of the present invention creatively use parameters of the transmittance for controlling the temperature, which matches the pressure control module in the above technical solution and mutually support and work together, thereby accurately monitoring and controlling the state of the supercritical carbon dioxide, the state of the carbon dioxide at the inlet of the compressor is stabilized around the critical point, the compressibility is good, the phase state is stable, the compressor power consumption is reduced, the influence of changes in the phase state of the supercritical gas on the working performance of the apparatus is avoided, and cycle efficiency of the Brayton cycle system is improved.

In an exemplary technical solution of the present disclosure, the transmittance may be actual transmittance obtained by means of analysis by the infrared spectrometer, or may be transmittance after standardizing a pipeline size.

According to this exemplary technical solution of the present disclosure, the transmittance after standardizing the pipeline size may exclude the influence of the pipe diameter on a transmittance test result.

In an exemplary technical solution of the present disclosure, the supercritical carbon dioxide state monitoring and control system based on the infrared spectrum characteristic analysis is used in the supercritical carbon dioxide Brayton cycle system, the structural arrangement of the supercritical carbon dioxide Brayton cycle system may be any one of a simple Brayton cycle, a recompression Brayton cycle, a recompression and partial cooling Brayton cycle, a recompression and reheat Brayton cycle, and a recompression and intermediate cooling Brayton cycle.

According to this exemplary technical solution, since the supercritical carbon dioxide serves as a cycle working medium in the supercritical carbon dioxide Brayton cycle system, compared with other working media, the supercritical carbon dioxide has lower corrosion rate of a pipeline apparatus, the system is compact in structure, small in occupied space and higher in cycle efficiency, the supercritical carbon dioxide state monitoring and control system based on the infrared spectrum characteristic analysis is applicable to various structure types of supercritical Brayton cycle systems, and may accurately monitor and control the pressure and the temperature of the carbon dioxide in the different structure types of supercritical carbon dioxide Brayton cycle systems according to actual needs, so as to improve the cycle efficiency of the different structure types of supercritical carbon dioxide Brayton cycle systems.

In an exemplary technical solution of the present disclosure, the supercritical carbon dioxide Brayton cycle system includes a compressor, the test section being arranged at an inlet of the compressor, and the carbon dioxide passing through the test section enters the compressor.

According to an exemplary technical solution, the test section is arranged at the inlet of the compressor and may monitor and control the state of the carbon dioxide about to enter the compressor, the carbon dioxide passing through the test section enters the compressor, it is guaranteed that the carbon dioxide entering the compressor approaches or reaches the critical point, the situation that the working medium entering the compressor deviates from the critical point to reduce the compressibility of the gas, and then the power consumption of the compressor is increased is avoided, and the situation that the working media with different phase states cause great influence on an impeller of the compressor and even accelerate the wear of motion components inside the compressor, which seriously influences the service life of the compressor is avoided.

According to an exemplary technical solution of the present disclosure, the test section of the supercritical carbon dioxide state monitoring and control system based on the infrared spectrum characteristic analysis is a tubular component, and a lens monitoring window allowing the detection beam from the infrared light source to pass through is arranged on an outer peripheral surface.

According to the exemplary technical solution, the test section is a tubular component, which is convenient for matching a pipeline of the compressor, or a part of the pipeline is directly used as the test section, the lens monitoring window allowing the detection beam from the infrared light source to pass through is arranged on the outer peripheral surface, the lens monitoring window allows the detection beam emitted from the infrared light source to transmit, and according to the transmitted luminous flux and incident luminous flux, the infrared spectrometer may obtain the transmittance of the carbon dioxide by means of analysis. At the same time, the lens may also be placed inside the pipeline, the lens and the spectrometer may be integrated into a system by means of an optical fiber, and a position of the lens may be determined according to the specific pipeline size, so as to exclude the influence of the pipeline size on the transmittance obtained by means of analysis by the spectrometer.

In an exemplary technical solution of the present disclosure, the supercritical carbon dioxide state monitoring and control system based on the infrared spectrum characteristic analysis also includes a pressure sensor in communication connection with the pressure control module.

According to the exemplary technical solution, the pressure sensor in communication connection with the pressure control module may measure the pressure of the carbon dioxide in the test section and adjusts, by means of the pressure control module, the pressure of the carbon dioxide entering the inlet of the compressor to approach or reach the set value of the supercritical carbon dioxide, so as to accurately monitor and control the pressure of the carbon dioxide entering the compressor.

In an exemplary technical solution of the present disclosure, a wavelength range of the detection beam of the supercritical carbon dioxide state monitoring and control system based on the infrared spectrum characteristic analysis is 1 μm-5 μm.

According to the exemplary technical solution, since the supercritical carbon dioxide behaves a strong absorption characteristic in an infrared spectral region of 1 μm-5 μm and has main absorption characteristic peaks at 2.8 μm and 4.2 μm and the wavelength range of the detection beam of the supercritical carbon dioxide state monitoring and control system based on the infrared spectrum characteristic analysis is 1 μm-5 μm, the detection beam in the range may guarantee that all absorption characteristic peaks may be detected and has high detection accuracy.

In an exemplary technical solution of the present disclosure, the pressure control module of the supercritical carbon dioxide state monitoring and control system based on the infrared spectrum characteristic analysis controls the pressure of the carbon dioxide at the set value by adjusting the working pressure of a back pressure valve at the inlet of the compressor.

According to the exemplary technical solution, the pressure sensor in the pressure control module may measure the pressure of the carbon dioxide in the test section, when the pressure of the carbon dioxide does not meet the preset value, the pressure control module adjust the working pressure of the back pressure valve at the inlet of the compressor to adjust and control the pressure of the carbon dioxide at the inlet of the compressor, the pressure of the carbon dioxide entering the compressor is stabilized close or equal to the set value, thus, the pressure of the carbon dioxide entering the inlet of the compressor may be accurately adjusted by means of the back pressure valve.

In an exemplary technical solution of the present disclosure, the supercritical carbon dioxide Brayton cycle system includes a precooler, and the temperature control module adjusts the temperature of the carbon dioxide by adjusting power of the precooler.

According to the exemplary technical solution, when the temperature control module adjusts the temperature of the carbon dioxide, an existing component in the Brayton cycle system may achieve adjustment, that is, the power of the precooler may be mainly adjusted to adjust the temperature of the carbon dioxide, such that the transmittance, obtained by means of analysis by the infrared spectrometer, of the carbon dioxide is close or equal to that of the carbon dioxide under a critical condition.

REFERENCE NUMBERS

1—pump; 2—monitoring and control system; 20—test section; 200—lens monitoring window; 21—infrared light source; 22—infrared spectrometer; 23—pressure control module; 230—pressure sensor; 24—temperature control module; 240—precooler; 3—compressor; 4—heat regenerator; 5—heat source; 6—turbine; and 7—generator.

DETAILED DESCRIPTION OF THE EMBODIMENTS

The technical solutions of one or more embodiments of the present disclosure will be described below clearly and comprehensively in conjunction with the accompanying drawings of the embodiments of the present disclosure. Apparently, the embodiments described are merely some embodiments rather than all embodiments of the present invention. Based on the embodiments of the present disclosure, all other embodiments acquired by those of ordinary skill in the art without creative work fall within the scope of protection of the present disclosure.

Hereinafter, embodiments of the present disclosure will be described with reference to the drawings.

Figure 1:
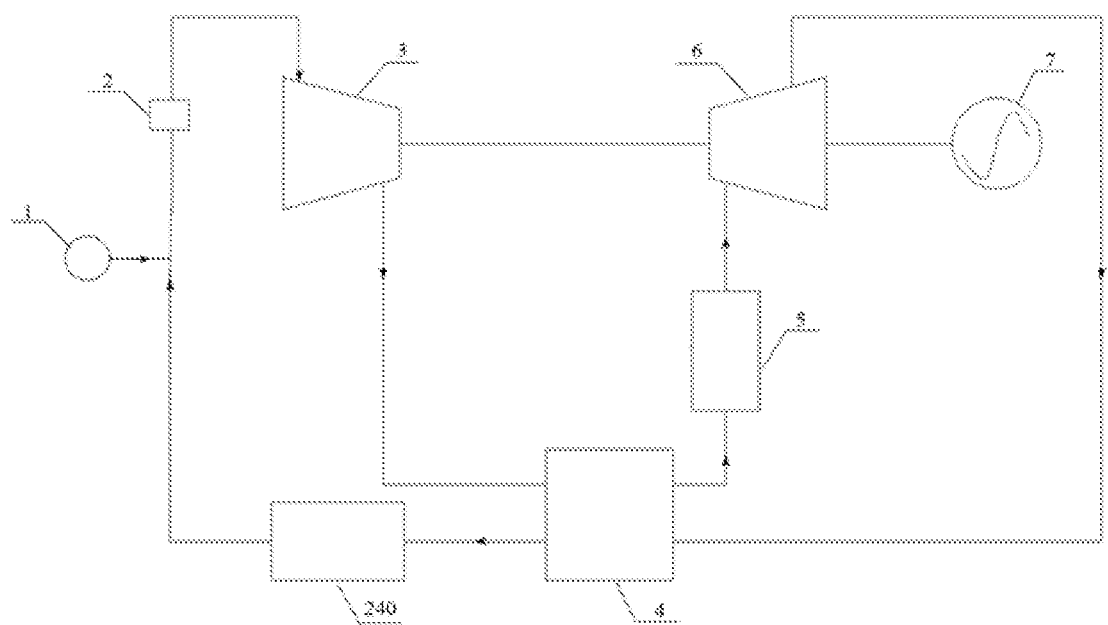
FIG. 1 is a schematic diagram of a supercritical carbon dioxide Brayton cycle system in an embodiment of the present disclosure.

FIG. 1 is a schematic diagram of a supercritical carbon dioxide Brayton cycle system in an embodiment of the present disclosure. As shown in FIG. 1, in this embodiment, the supercritical carbon dioxide Brayton cycle system mainly includes: a heat source 5, a turbine 6, a heat regenerator 4, a generator 7, a precooler 240, a compressor 3, a pump 1 and a monitoring and control system 2. In this cycle system, carbon dioxide serves as a working medium, the carbon dioxide acquires heat from the heat source 5, and enters the turbine 6 to do work in a high temperature and pressure state so as to drive the generator 7 to rotate to generate electricity, the working medium after doing work enters the heat regenerator 4 to recover the remaining heat, is cooled by means of the precooler 240, then is compressed by the compressor 3 and heated by the heat regenerator 4, then enters the heat source 5 to absorb heat and continues to circulate to do work, and the monitoring and control system 2 may monitor and control the state of the carbon dioxide to guarantee that the carbon dioxide, in a state around a critical point or under a critical state, enters the compressor 3 apparatus of the supercritical carbon dioxide Brayton cycle system.

In addition, the carbon dioxide has relatively stable chemical properties, good physical properties, reliable safety, low price and easy availability, in the embodiment of the present disclosure, since the carbon dioxide serves as a cycle working medium, no freezing problem exists, when ambient temperature is low, start-up time of a unit may be greatly reduced, and higher cycle efficiency may be achieved, in other embodiments of the present disclosure, the monitoring and control system 2 may also be used to monitor and control states of other supercritical gas.

Figure 2:
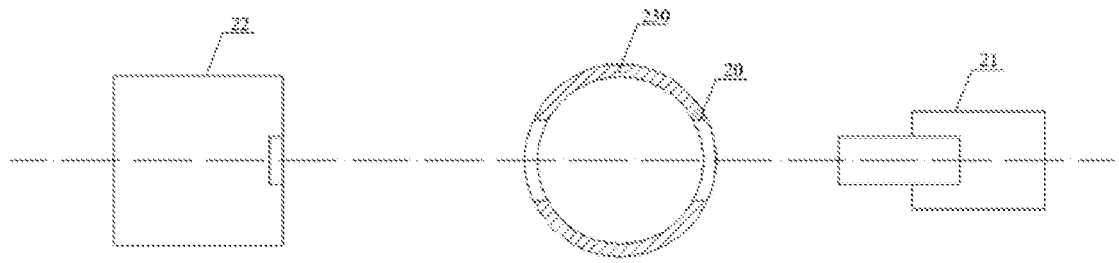
FIG. 2 is a schematic diagram of a supercritical carbon dioxide state monitoring and control system based on infrared spectrum characteristic analysis in the embodiment of the present disclosure.
Figure 3:
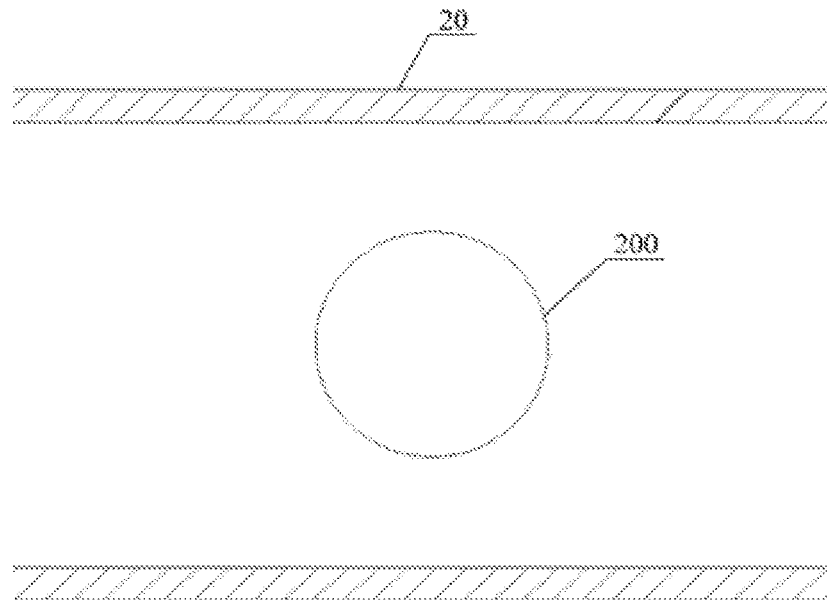
FIG. 3 is a structural schematic diagram of a test section in FIG. 2.
Figure 4:
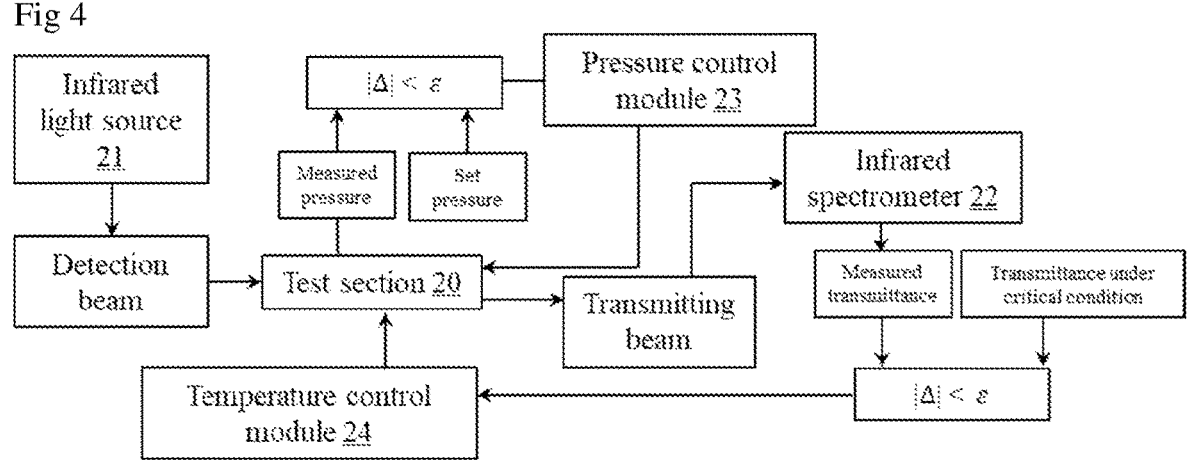
FIG. 4 is a schematic diagram of supercritical carbon dioxide state monitoring and control based on the infrared spectrum characteristic analysis in the embodiment of the present disclosure.

FIG. 2 is a schematic diagram of the supercritical carbon dioxide state monitoring and control system 2 based on the infrared spectrum characteristic analysis in an embodiment of the present disclosure. FIG. 3 is a structural schematic diagram of a test section in FIG. 2. FIG. 4 is a schematic diagram of supercritical carbon dioxide state monitoring and control based on the infrared spectrum characteristic analysis in an embodiment of the present disclosure.

With reference to FIGS. 2 and 4, the supercritical carbon dioxide state monitoring and control system 2 based on the infrared spectrum characteristic analysis in this embodiment includes: a test section 20 for carbon dioxide to pass through; an infrared light source 21 emitting a detection beam to the carbon dioxide passing through the test section 20; an infrared spectrometer 22 receiving and analyzing the detection beam passing through the carbon dioxide; a pressure control module 23 controlling pressure of the carbon dioxide at a set value, that is, around critical pressure; and a temperature control module 24 adjusting temperature of the carbon dioxide to around critical temperature. The infrared spectrometer 22 here is shown schematically, and actually, the infrared spectrometer includes a light-receiving fiber, a CCD sensor, an analysis device, etc. It is to be noted that the supercritical fluid is not limited to the carbon dioxide and may be other fluids.

With reference to FIGS. 2 and 4, the supercritical carbon dioxide state monitoring and control system 2 based on the infrared spectrum characteristic analysis further includes a pressure sensor 230 in communication connection with the pressure control module 23.

The pressure control module 23 of the supercritical carbon dioxide state monitoring and control system 2 controls the pressure of the carbon dioxide at the set value by adjusting working pressure of a back pressure valve (not shown) at the inlet of the compressor 3.

Specifically, when the carbon dioxide working medium passes through the test section 20, the infrared light source 21 emits a detection beam to the carbon dioxide passing through the test section 20, and analyzes the transmittance of the detection beam by means of the infrared spectrometer 22, the pressure sensor 230 in the pressure control module 23 may measure the pressure of the carbon dioxide passing through the test section 20 and about to enter the inlet of the compressor 3, when the pressure of the carbon dioxide does not reach the pressure of the carbon dioxide under the critical condition, the pressure control module 23 controls the pressure of the carbon dioxide at the set value by adjusting the working pressure of the back pressure valve at the inlet of the compressor 3, or meanwhile, the transmittance measured by the infrared spectrometer 22 is compared with the transmittance, corresponding to the set value pressure, of the supercritical carbon dioxide in the critical state, the temperature control module 24 adjusts the temperature of the carbon dioxide to stabilize the transmittance of the carbon dioxide at a value close or equal to the transmittance in the critical state, so as to monitor and control the pressure and temperature of the carbon dioxide entering the inlet of the compressor 3.

More specifically, the pressure sensor 230 is a sensor that converts pressure into an electrical signal for output, which includes an elastic sensitive element and a displacement sensitive element, the pressure sensor 230 has the characteristics of high dynamic response speed, accuracy, reliability, etc., and the pressure sensor 230 may be a capacitive pressure sensor or a variable magnetoresistive pressure sensor in some embodiments of the present disclosure and may also be a Hall pressure sensor, an optical fiber pressure sensor, etc. in other embodiments of the present disclosure. A pressure controller may use a metal 316L diaphragm sensor which may be used for a gas medium, has an optional adjustment range within a range of −0.1 MPa-40 MPa, and well meets pressure adjustment requirements due to the fact that the pressure of the carbon dioxide under the critical condition is 7.38 MPa. The pressure controller is small in size and small in weight, has high accuracy during pressure adjustment, and may be directly installed in the test section 20 so as to control the pressure of the carbon dioxide, at inlet of the compressor 3, around the set value.

In this embodiment, the back pressure valve is equipped with an adjustment mechanism, and when the pump 1 operates, the back pressure valve may make the pipeline between the pump 1 and the back pressure valve maintain a certain pressure. When the pressure of the carbon dioxide at the inlet of the compressor 3 does not reach the set value, the pressure of the carbon dioxide is adjusted by adjusting the adjustment mechanism of the back pressure valve. More specifically, in some embodiments of the present disclosure, a spring is provided in the back pressure valve, the pressure adjustment is achieved by adjusting elastic force of the built-in spring, when the pressure of the carbon dioxide is less than the set pressure, a diaphragm blocks the pipeline under the action of the elastic force of the spring to increase the pressure of carbon dioxide, and when the pressure of the carbon dioxide is greater than the set pressure, the diaphragm compresses the spring and the pipeline is connected to reduce the pressure of carbon dioxide; and in other embodiments of the present disclosure, the back pressure valve and a pulsation damper may also be used simultaneously, and the pressure between the pump 1 and the back pressure valve may be adjusted by adjusting the pulsation damper. The back pressure valve in this embodiment may be a one-way valve, a sequence valve, etc. Since the back pressure valve with compact structure, stable performance, simple installation and debugging, sensitive response and reproducible ability may well meet the accuracy requirements of the supercritical carbon dioxide for pressure monitoring.

With reference to FIGS. 1 and 4, the supercritical carbon dioxide Brayton cycle system includes a precooler 240, and the temperature control module 24 adjusts the temperature of the carbon dioxide by adjusting power of the precooler 240.

In this embodiment, when the transmittance, obtained by means of the actual analysis by the infrared spectrometer 22, of the supercritical carbon dioxide still greatly differs from the transmittance thereof at the critical state after the pressure of the gas is stabilized at the set value by the pressure control module 23, the temperature of the carbon dioxide is adjusted by means of the temperature control module 24, and more precisely, the temperature of the carbon dioxide is adjusted by adjusting the power of the precooler 240, such that the transmittance, obtained by means of analysis by the infrared spectrometer 22, of the carbon dioxide is close or equal to the that of the carbon dioxide under the critical condition, so as to accurately monitor and control the temperature of the supercritical carbon dioxide. Since physical property mutation of the supercritical carbon dioxide in a quasi-critical zone occurs under the condition that an operation point of the compressor 3 is controlled in a high-density region around quasi-critical temperature, an operation point of the heat regenerator 4 is controlled in a low-density region after the quasi-critical temperature, accordingly, the compression power consumption is guaranteed to be reduced on the premise of carbon dioxide cooling, and in addition, the supercritical carbon dioxide has the characteristics of high density and no phase change within a certain range of operation parameters, which makes the supercritical carbon dioxide Brayton cycle system high in cycle efficiency.

Specifically, the temperature control module 24 may include a temperature controller or be in communication connection with the temperature controller, the temperature controller may adjust the power of the precooler 240, so as to adjust the temperature at the inlet of the compressor 3 to reach the temperature of the carbon dioxide under the critical condition.

Those skilled in the art may understand that the structure of the pressure control module or the temperature control module is not particularly limited, as long as it can be linked with the back pressure valve or the precooler 240, and specific circuit design of pressure or temperature adjustment is also the general knowledge of those skilled in the art and will not be described in detail here.

The supercritical carbon dioxide state monitoring and control system 2 based on the infrared spectrum characteristic analysis is used in the supercritical carbon dioxide Brayton cycle system, and the structural arrangement of the supercritical carbon dioxide Brayton cycle system may be any one of a simple Brayton cycle, a recompression Brayton cycle, a recompression and partial cooling Brayton cycle, a recompression and reheat Brayton cycle, and a recompression and intermediate cooling Brayton cycle.

In this embodiment, since the supercritical carbon dioxide is used as the cycle working medium in the supercritical carbon dioxide Brayton cycle system, compared with other working media, the carbon dioxide has lower corrosion rate of a pipeline apparatus, the system is compact in structure, small in occupied space and higher in cycle efficiency, the supercritical carbon dioxide state monitoring and control system 2 based on the infrared spectrum characteristic analysis is applicable to various structure types of supercritical carbon dioxide Brayton cycle systems, and may accurately monitor and control the temperature and the pressure of the carbon dioxide in the different structure types of supercritical carbon dioxide Brayton cycle systems according to actual needs, so as to improve the cycle efficiency of the different structure types of supercritical carbon dioxide Brayton cycle system.

With reference to FIGS. 1 and 2, the supercritical carbon dioxide Brayton cycle system also includes the compressor 3, the test section 20 is arranged at the inlet of the compressor 3, and the carbon dioxide passing through the test section 20 enters the compressor 3.

In this embodiment, the test section 20 is arranged at the inlet of the compressor 3 and may monitor and control the state of the carbon dioxide about to enter the compressor 3, the carbon dioxide passing through the test section 20 enters the compressor 3, it is guaranteed that the carbon dioxide entering the compressor 3 approaches or reaches the critical point, the situation that the carbon dioxide entering the compressor 3 deviates from the critical point to reduce the compressibility of the gas, and then the power consumption of the compressor 3 is increased is avoided, and the situation that the working media with different phase states cause great influence on an impeller of the compressor 3 and even accelerate the wear of the motion components inside the compressor 3, which seriously influences the service life of the compressor 3 is avoided.

According to the needs in an actual application process, the test section 20 in this embodiment is arranged at the inlet of the compressor 3, but is not limited to the inlet of the compressor 3, and in other embodiments of the present disclosure, it may also be arranged at an inlet of the heat regenerator 4, etc., and accordingly, the situation that part of the heat may not be recovered due to the presence of a high-density region of the carbon dioxide in the heat regenerator 4, thereby reducing the cycle efficiency of the system is avoided.

With reference to FIG. 3, the test section 20 of the supercritical carbon dioxide state monitoring and control system 2 based on the infrared spectrum characteristic analysis is a tubular component, and a lens monitoring window 200 allowing the detection beam from the infrared light source 21 to pass through is arranged on an outer peripheral surface.

In this embodiment, the test section 20 is a tubular component, which is convenient for matching a pipeline, in communication with the compressor 3, of the Brayton cycle system, or a part of the pipeline is directly used as the test section 20, the lens monitoring window 200 allowing detection beam from the infrared light source 21 to pass through is arranged on the outer peripheral surface, the lens monitoring window 200 allows the detection beam emitted from the infrared light source 21 to transmit, and according to the transmitted luminous flux and incident luminous flux, the infrared spectrometer 22 may obtain the transmittance of the carbon dioxide by means of analysis.

The wavelength range of the detection beam of the supercritical carbon dioxide state monitoring and control system 2 based on the infrared spectrum characteristic analysis is 1 μm-5 μm, for example.

In this embodiment, since the supercritical carbon dioxide behaves a strong absorption characteristic in an infrared spectral region of 1 μm-5 μm and has main absorption characteristic peaks are at 2.8 μm and 4.2 μm and the wavelength range of the detection beam of the supercritical carbon dioxide state monitoring and control system 2 based on the infrared spectrum characteristic analysis is 1 μm-5 μm, the detection beam in the range may guarantee that the main absorption characteristic peaks may be detected and has high detection accuracy.

Figure 5:
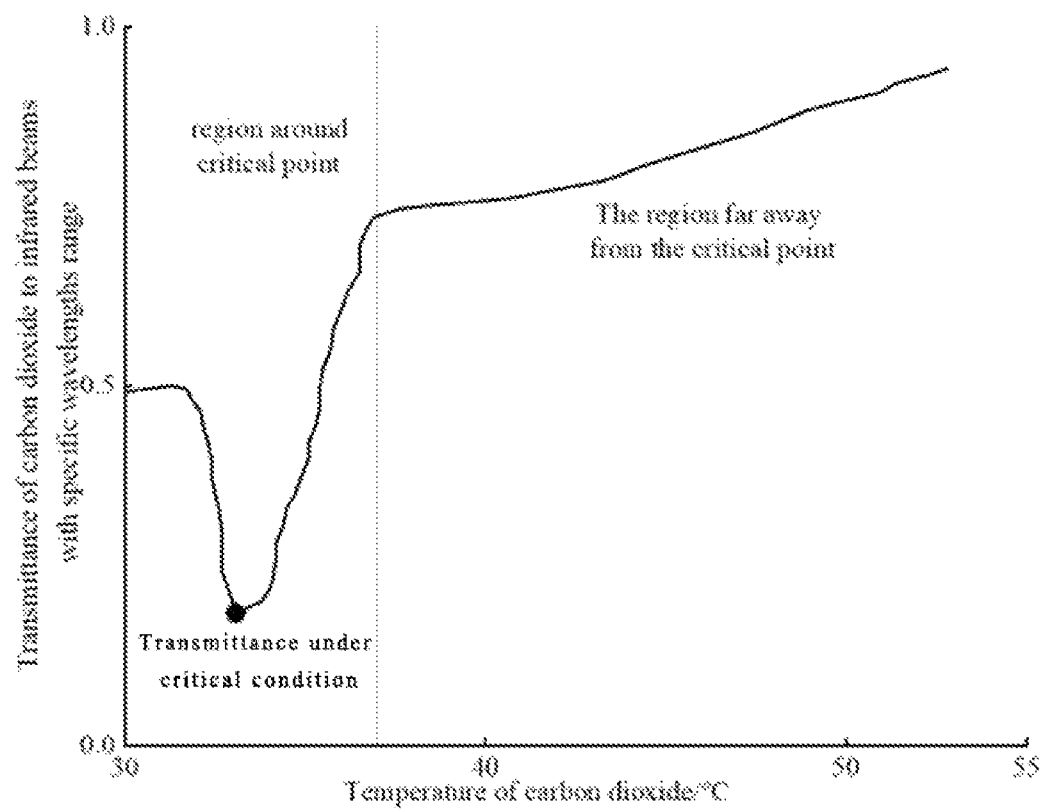
FIG. 5 is a diagram showing the transmittance of carbon dioxide to a detection beam at different temperatures in the embodiment of the present disclosure.

FIG. 5 is a diagram showing the transmittance of carbon dioxide to a detection beam at different temperatures in an embodiment of the present disclosure. As shown in the figure, when the pressure is 7.5 MPa, as for the transmittance of the supercritical carbon dioxide, around the critical temperature, to the detection beam with a wavelength of 3600 nm-3700 nm, it can be found that the transmittance of the carbon dioxide in this wavelengths range is sensitive to the temperature changes, and accordingly, the transmittance of the carbon dioxide in this wavelengths range may be used to characterize a temperature state of the carbon dioxide. When the monitoring and control system 2 is used to monitor and control the state of the carbon dioxide at the inlet of the compressor 3, a change range of the transmittance of the carbon dioxide is located around the critical point; and when the monitoring and control system 2 is used to monitor and control the state of the carbon dioxide at the inlet of the heat regenerator 4, the turbine 6, etc., the change of the transmittance of the carbon dioxide is located far away from the critical point and has the characteristics of one-way change. When the monitoring and control system 2 is used to monitor and control the state of the carbon dioxide at the inlet of the compressor 3, the pressure control module 23 stabilizes the pressure of the gas at the set value, under the condition that the transmittance obtained by means of the infrared spectrometer 22 greatly differs from that at set pressure and critical temperature, the temperature control module 24 reduces or increases the temperature of the carbon dioxide by adjusting the power of the precooler 240, so as to reduce the transmittance to approach or reach the transmittance at the critical temperature; when the monitoring and control system 2 is used to monitor and control the state of the carbon dioxide at the inlet of the heat regenerator 4, the turbine 6, etc., the pressure control module 23 stabilizes the pressure of the gas at the set value, under the condition that the transmittance obtained by means of the infrared spectrometer 22 is higher than that at the set pressure and critical temperature, the temperature control module 24 reduces the temperature of the carbon dioxide by adjusting the power of the precooler 240, so as to reduce the transmittance to approach or reach the transmittance at the critical temperature; and under the condition that the transmittance obtained by means of the infrared spectrometer 22 is lower than that at the set pressure and critical temperature, the temperature control module 24 increases the temperature of the carbon dioxide by adjusting the power of the precooler 240, so as to increase the transmittance to approach or reach the transmittance at the critical temperature. Thus, the temperature control module 24 may adjust the power of the precooler 240 to adjust the temperature of the gas, and the transmittance of the gas is stabilized around the transmittance corresponding to the critical condition by means of the temperature control module 24, such that the temperature of the supercritical carbon dioxide at the inlet of the compressor 3 is controlled around the critical temperature, which may reduce the power consumption of the compressor 3, thereby improving the working performance of the compressor 3 and improving the efficiency of the Brayton cycle system.

The above embodiments are merely exemplary embodiments of the present disclosure but not intended to limit the present invention, and any modification, equivalent replacement and improvement made within the spirit and principle of the present disclosure shall be included in the scope of protection of the present disclosure.

What is claimed is:

1. A supercritical carbon dioxide state monitoring and control system based on infrared spectrum characteristic analysis, which comprises:
   a test section for carbon dioxide to pass through;

an infrared light source emitting a detection beam to the carbon dioxide passing through the test section;

an infrared spectrometer configured to receive and analyze the detection beam passing through the carbon dioxide;

a pressure control module configured to control pressure of the carbon dioxide at a set value; and a temperature control module configured to adjust temperature of the carbon dioxide.

2. The supercritical carbon dioxide state monitoring and control system based on the infrared spectrum characteristic analysis according to claim 1, wherein the supercritical carbon dioxide state monitoring and control system is used in a supercritical carbon dioxide Brayton cycle system, and the structural arrangement of the supercritical carbon dioxide Brayton cycle system is selected from the group consisting of: a simple Brayton cycle, a recompression Brayton cycle, a recompression and partial cooling Brayton cycle, a recompression and reheat Brayton cycle, and a recompression and intermediate cooling Brayton cycle.

3. The supercritical carbon dioxide state monitoring and control system based on the infrared spectrum characteristic analysis according to claim 2, wherein the supercritical carbon dioxide Brayton cycle system comprises a compressor, the test section being arranged at an inlet of the compressor, and the carbon dioxide passing through the test section enters the compressor.

4. The supercritical carbon dioxide state monitoring and control system based on the infrared spectrum characteristic analysis according to claim 3, wherein the test section comprises a tubular component, and a lens monitoring window, which allows the detection beam from the infrared light source to pass through, is arranged on an outer peripheral surface.

5. The supercritical carbon dioxide state monitoring and control system based on the infrared spectrum characteristic analysis according to claim 3, further comprising a pressure sensor in communication connection with the pressure control module.

6. The supercritical carbon dioxide state monitoring and control system based on the infrared spectrum characteristic analysis according to claim 3, wherein a wavelength range of the detection beam is 1 μm-5 μm.

7. The supercritical carbon dioxide state monitoring and control system based on the infrared spectrum characteristic analysis according to claim 3, wherein the pressure control module is configured to control the pressure of the carbon dioxide at the set value by adjusting working pressure of a back pressure valve at an inlet section of the compressor.

8. The supercritical carbon dioxide state monitoring and control system based on the infrared spectrum characteristic analysis according to claim 2, wherein the supercritical carbon dioxide Brayton cycle system comprises a precooler, and the temperature control module is configured to adjust the temperature of the carbon dioxide by adjusting power of the precooler.

9. The supercritical carbon dioxide state monitoring and control system based on the infrared spectrum characteristic analysis according to claim 1, wherein the infrared spectrometer is configured to obtain actual transmittance by analysis by the infrared spectrometer, or after standardizing a pipeline size.

* * * * *